(12) United States Patent
Iyer et al.

(10) Patent No.: US 9,330,030 B2
(45) Date of Patent: May 3, 2016

(54) BRIDGE DECODER FOR A VEHICLE INFOTAINMENT SYSTEM

(71) Applicant: Google Inc., Mountain View, CA (US)

(72) Inventors: Rakesh Narayan Iyer, Sunnyvale, CA (US); Zhen Song, Sunnyvale, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/313,260

(22) Filed: Jun. 24, 2014

(65) Prior Publication Data

US 2015/0370729 A1    Dec. 24, 2015

(51) Int. Cl.
*G06F 13/10* (2006.01)
*G06F 13/20* (2006.01)
*G06F 11/30* (2006.01)

(52) U.S. Cl.
CPC .......... *G06F 13/102* (2013.01); *G06F 11/3027* (2013.01); *G06F 11/3055* (2013.01); *G06F 13/20* (2013.01)

(58) Field of Classification Search
CPC .............. H04L 12/266; H04L 43/0811; H04L 43/0876; H04L 63/02; H04L 63/08; H04L 63/107; H04L 67/12; H04B 5/0031; H04B 5/0037; G08B 21/22; B60W 50/10; H04W 12/12; H04W 12/06; H04W 12/08; H04W 28/0215; H04W 28/06; H04W 36/08; H04W 40/20; H04W 48/02; H04W 48/06; H04W 48/18; H04W 4/046; H04W 52/12; H04W 52/143; H04W 52/225; H04W 52/241; H04W 52/346; H04W 72/0406; H04W 72/042; H04W 72/0493; H04W 84/005; H04W 84/12; H04W 92/18; G06F 11/3055; G06F 11/30527; G06F 13/20; G06F 13/102
See application file for complete search history.

(56) References Cited

U.S. PATENT DOCUMENTS

| | | | | |
|---|---|---|---|---|
| 7,191,053 | B2 * | 3/2007 | Dery | 701/113 |
| 8,989,954 | B1 * | 3/2015 | Addepalli et al. | 701/32.3 |
| 2011/0041178 | A1 * | 2/2011 | Jakobsson et al. | 726/22 |
| 2011/0063138 | A1 * | 3/2011 | Berkobin et al. | 340/988 |
| 2011/0082621 | A1 * | 4/2011 | Berkobin et al. | 701/33 |
| 2013/0024933 | A1 * | 1/2013 | Jakobsson et al. | 726/22 |
| 2013/0029595 | A1 * | 1/2013 | Widmer et al. | 455/39 |
| 2014/0380001 | A1 * | 12/2014 | Schubert et al. | 711/153 |
| 2015/0054647 | A1 * | 2/2015 | Edwards | 340/568.1 |
| 2015/0133108 | A1 * | 5/2015 | Ahmed et al. | 455/420 |
| 2015/0138120 | A1 * | 5/2015 | Le et al. | 345/173 |
| 2015/0142416 | A1 * | 5/2015 | Lee et al. | 704/2 |
| 2015/0142428 | A1 * | 5/2015 | Zhao et al. | 704/231 |
| 2015/0143277 | A1 * | 5/2015 | Yoon et al. | 715/773 |

* cited by examiner

*Primary Examiner* — James Trammell
*Assistant Examiner* — James E Stroud
(74) *Attorney, Agent, or Firm* — Morris & Kamlay LLP

(57) ABSTRACT

An intermediary device may be utilized to form a communication bridge between a vehicle infotainment system and a remote device. The computing device forming the bridge may send and receive the data sent between the motor vehicle infotainment system and the remote device. The intermediary device may mimic the infotainment system or the remote device and/or an instruction sent by the infotainment system and/or the remote device.

16 Claims, 4 Drawing Sheets

BRIDGE DECODER FOR A VEHICLE INFOTAINMENT SYSTEM

BACKGROUND

In some connections between devices, such as a USB connection, one device may assume the role of a host device and another device may assume the role of an accessory device. A vehicle system may have an on-board computer system (such as an infotainment system) that can act as the host device and a mobile device (such as a smartphone) that is connected to it may assume the role of an accessory. It may be difficult or impossible to access instructions and other communications between the vehicle system and the mobile device for the purpose, for example, of troubleshooting, diagnostics and the like.

BRIEF SUMMARY

According to an implementation, at least one of a vehicle infotainment system and a remote device that is physically separate from the vehicle system may be physically connected to an intermediary device. The intermediary device may be physically separate from both the vehicle system and the remote device. The intermediary device may configure at least one of the vehicle infotainment system and the remote device to be in an accessory mode. One or more packets exchanged or sent between the intermediary device and at least one of the vehicle infotainment system and the remote device may be detected. A report may be generated regarding the contents of the one or more packets transmitted or exchanged.

A device is disclosed that includes a connection port and a processor. The connection port may receive a physical connection of at least one of a vehicle infotainment system and a remote device. The processor may be configured to set at least one of the vehicle infotainment system and the remote device to be in an accessory mode. The processor may be configured to detect one or more packets exchanged or transmitted between the device and the vehicle infotainment system and/or the remote device. The processor may be configured to generate a report of the contents of each of the one or more packets exchanged between the device and vehicle infotainment system and/or the remote device.

In an implementation, a system according to the presently disclosed subject matter includes a means for physically connecting by a cable a vehicle infotainment system and/or a remote device that is physically separate from the vehicle system to an intermediary device. The intermediary device may be physically separate from both the vehicle system and the remote device other than the physical connection by the cable. The system may include a means for configuring, by the intermediary device, the vehicle infotainment system and/or the remote device to be in an accessory mode. The system may include a means for detecting one or more packets exchanged between the vehicle infotainment system and/or the first computing device via the intermediary device. The system may include a means for generating a report of the contents of one or more of the packets exchanged between the vehicle infotainment system and the remote device.

Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

A cable utilized to connect a vehicle system and a mobile device (e.g., a laptop, a smartphone, a tablet, etc.) may prevent discover or observation of instructions sent from the vehicle system to the mobile device or from the mobile device to the vehicle system. This can make it difficult to diagnose problems with the connection or with the behavior of the mobile device and/or the vehicle system with respect to each other. To solve this problem, an intermediary device (for example, a tablet computer) can be placed in between the vehicle system and the mobile device. The intermediary device can assume the role of host for both the vehicle system and the mobile device. The vehicle system and the mobile device can each assume the role of accessory. In these modes, the intermediary device can monitor and analyze communications between the vehicle system and the mobile device and help to report, resolve and remedy any connection and communications issues.

Figure 1:
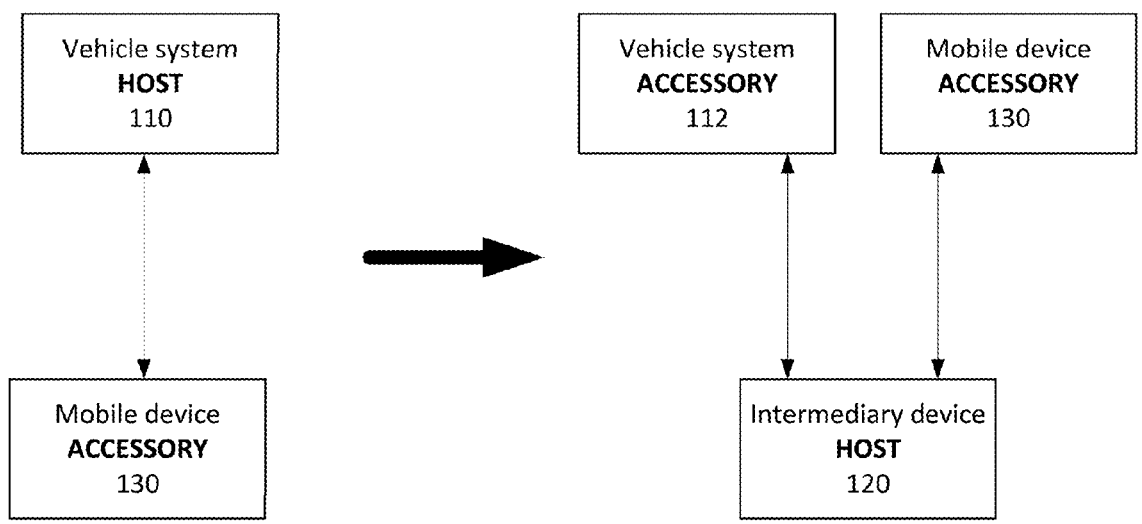
FIG. 1 shows an overview of the bridge that may be formed between a vehicle system, a remote device, and an intermediary that acts as a host device as disclosed herein.

As shown in FIG. 1, a vehicle system (e.g., the infotainment system) 110 may ordinarily act as a host device when a mobile device (e.g., a remote device) 130 is connected to it. As disclosed herein, and as shown in FIG. 1, the vehicle system 112 can be placed in an accessory mode that can connect to an intermediary device (e.g., a tablet or a laptop) 120. The intermediary device 120 can act as the host device. The mobile device 130 can connect to the intermediary device 120 with the mobile device 130 in accessory mode. In this configuration, data that flows through the vehicle system 112 and mobile device 130 can be routed, halted, stored, inspected, transmitted, etc. by the intermediary device 120. For example, a deep packet inspection may be performed on packets transmitted between the vehicle system and/or devices shown in FIG. 1. This may be advantageous for development of software that can be utilized to interface the mobile device with the vehicle system.

The vehicle system may contain an infotainment system that is a component of a projected architecture system in which a mobile device connected to the vehicle system drives the display of the infotainment system. The mobile device may receive an indication of the vehicle system's buttons and/or knobs available for use with the infotainment system. For example, a navigation application operated on the mobile device may be presented on the display of the infotainment system. A user may interact with the navigation application utilizing the controls provided by the vehicle's infotainment system. The user inputs may be received and responded to by the mobile device. In such an architecture, the vehicle system may ordinarily be a host device. However, during an initialization procedure, the intermediary device that can bridge the mobile device and the vehicle system may be set as the host device and the other devices connected to it (e.g., the vehicle system and the mobile device) may be configured to be in an accessory mode. An accessory mode may allow a user to connect a host device or hardware. The host device may provide power over the connection (e.g., as with USB) and may manage devices connected to it. In some configurations, the host device may manage data transmitted between the one or more accessory devices and/or the host device.

Because the computing device may be forwarding packets form both sides (e.g., the vehicle system and the mobile device), it can log what data are exchanged or transmitted between both sides. The intermediary device can emulate a disconnect signal, for example, by preventing communication from one side (e.g., the mobile device) from reaching the other side (e.g., the vehicle system). Moreover, because the intermediary device can emulate the vehicle system, the mobile device, and/or functions of either the vehicle system or the mobile device, it may not be necessary to have the mobile device or the vehicle system present in some cases.

Figure 2:
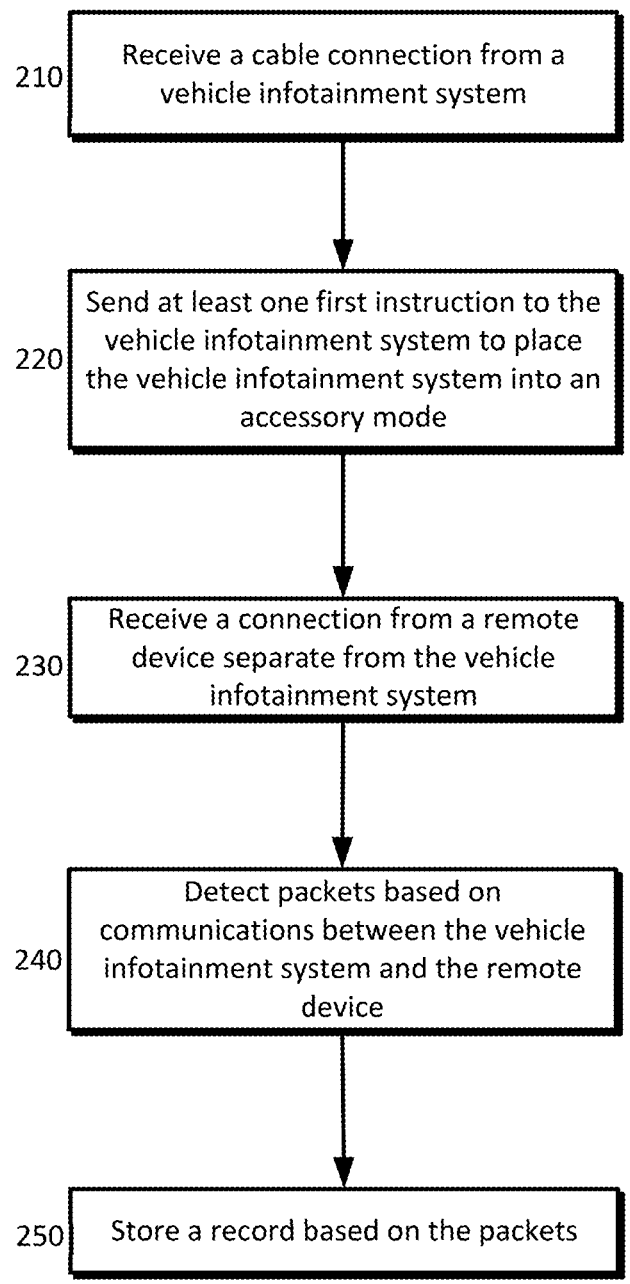
FIG. 2 is an example process for generating a report of packets exchanged between a vehicle infotainment system and/or a remote device as disclosed herein.

In an implementation, an example of which is provided in FIG. 2, the intermediary device may receive a cable connection from a vehicle infotainment system at 210. At least one of a vehicle infotainment system and a remote device (e.g., a smartphone, a tablet, and a laptop) may be physically connected to an intermediary device (e.g., a smartphone, a tablet, and a laptop). The physical connection may be formed by a cable connection (e.g., USB). The remote device and the infotainment system may be physically separate. Similarly, other than the cable connecting the remote device and/or the vehicle infotainment system, the intermediary may be physically separate from the vehicle system infotainment system and the remote device.

At least one first instruction may be sent to the vehicle infotainment system to place the infotainment system into an accessory mode at 220. The intermediary device may configure the vehicle infotainment system and/or the remote device to be in an accessory mode. As described earlier, during initialization of the intermediary device, it may be set to be in a host mode (or act as a host device). If devices are subsequently connected to the intermediary device, they may be placed into an accessory mode. For example, the intermediary device may issue an instruction during initialization of the vehicle infotainment system that causes it to be in an accessory mode. In some configurations, prior to connecting to the intermediary device, the infotainment system and/or the remote device may be placed into an accessory mode by a setting on each device. A bridge between the remote device and the infotainment system may be formed during operation of both the vehicle and the remote device utilizing the intermediary device. Thus, the system may receive a connection from the remote device separate from the infotainment system or simultaneously therewith at 230.

Data packets sent between the remote device and the infotainment system may be detected at 240. The data packets may be exchanged between the remote device and the infotainment system via the bridge formed with the intermediary device. The data packets may be copied, inspected, deleted, rerouted, etc. For example, a user may desire to emulate an infotainment system with the intermediary device. The intermediary device, emulating the infotainment system and connected to the mobile device (e.g., the remote device), may receive a command from the mobile device. The intermediary device may transmit a confirmation that the command was followed or other response to the mobile device. The command sent by the mobile device and the response sent by the infotainment system may be logged by the intermediary device. A record may be stored by the intermediary device based on the data packets at 250. The record may contain, for example, a log of commands issued and/or responses received by the infotainment system and/or the remote device. The record may indicate any input provided via the intermediary device, a time indication, etc. The mobile device may independently store a log of one or more commands, instructions, input data, and responses that it has received and/or sent as well as an indication of actions taken in response to commands, instructions, and input data. Thus, the intermediary device can emulate the remote device and/or the vehicle infotainment system. This may be useful, for example if the vehicle system containing the infotainment system is not yet made or access thereto is difficult.

Rather than emulate the entire infotainment system and/or the remote device, the intermediary device may emulate an instruction or input data sent or received from the vehicle system or remote device. For example, the intermediary device may generate a disconnect signal that mimics the remote device being disconnected from the vehicle infotainment system (e.g., unplugging a USB cable from the remote device). The intermediary device may send the disconnect signal to the infotainment system. If the remote device is connected to the intermediary device, the intermediary device may block any transmissions from the remote device. The intermediary device may have one or more rules to manage data packet transmissions that it intercepts. For example, if the instruction the intermediary device is emulating is that of the remote device, the instruction may be sent to the vehicle infotainment system. Similarly, if the instruction being emulated is that of the vehicle infotainment system, the instruction may be sent to the remote device.

A report may be generated the includes an indication of the one or more packets exchanged, transmitted, received, and/or sent between the intermediary device and the vehicle infotainment system and/or the first computing device. The report may include an indication of the command or instruction that was sent and an indication of the response thereto. For example, a disconnect signal may indicate that a device no longer occupies a particular USB port and the time of the disconnection. Thus, a developer may determine if the command sent was in fact received by the corresponding device. In some instances, the packets may need to be decoded. For example, a response to a command that is received by the intermediary device may be a short code. The intermediary device may contain a table of codes and a corresponding meaning of the code. The definition or meaning of the code may be provided in the report or log file that is generated.

Figure 3:
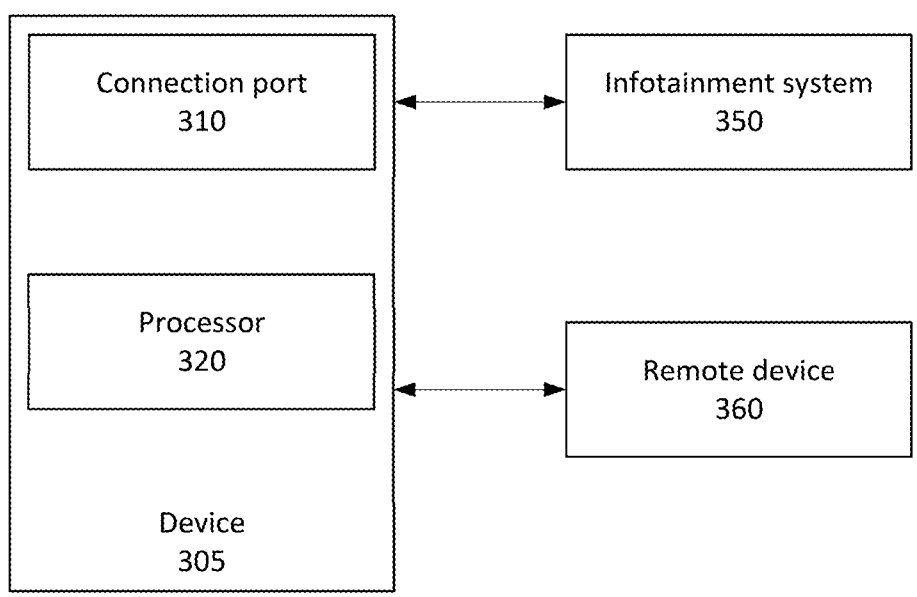
FIG. 3 is an example intermediary device that generates a report of packets exchanged between a vehicle infotainment system and/or a remote device as disclosed herein.

An example of an intermediary device 305, as disclosed herein, is provided in FIG. 3. The device 305 may include one or more connection ports 310 and/or a communication module. The connection port 310 may be configured to receive a physical connection of a motor vehicle infotainment system 350 and/or a remote device 360 such as a mobile phone. A communication module may be utilized to connect the intermediary device 305 to the Internet or to connect wirelessly with the infotainment system 350 and/or the remote device 360. A wireless communication protocol (e.g., Bluetooth) may be utilized for any of the implementations disclosed herein.

The device 305 may include a processor 320 that is configured to set the vehicle infotainment system 350 and/or the computing device 360 to an accessory mode. As described above, the infotainment system 350 and/or the remote device 360 may be set to an accessory mode independent of the device 305. The processor 320 may be configured to detect one or more packets exchanged between the device 305 and the infotainment system 350 and/or the computing device 360. The processor 320 may be configured to store a record based on the packets and/or generate a report of the contents of the packets exchanged between the device 305 and the infotainment system 350 and/or the remote device 360.

Figure 4:
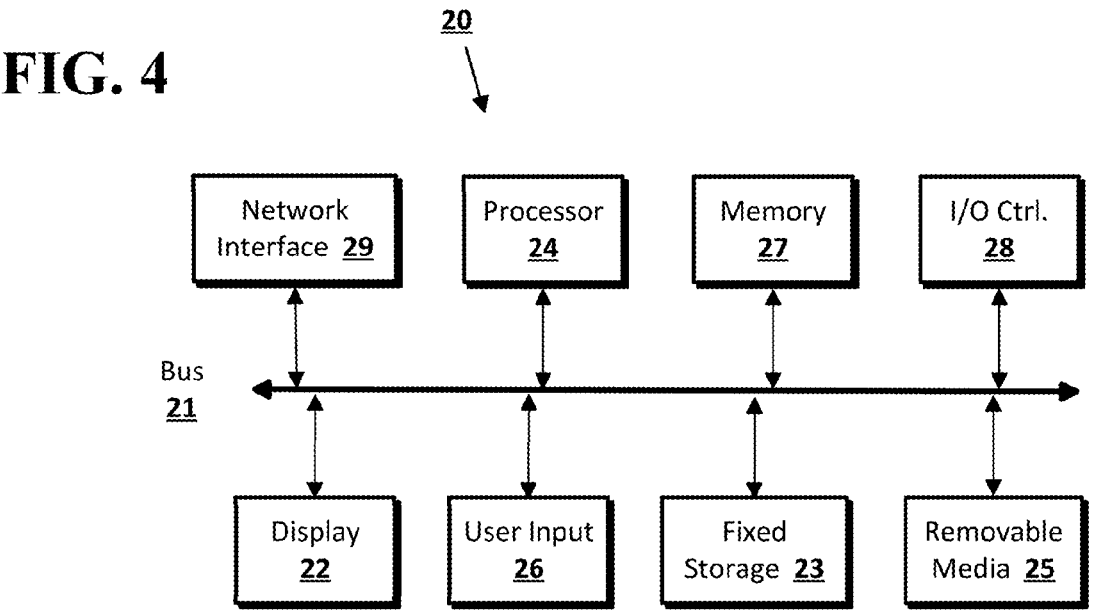
FIG. 4 shows a computer according to an implementation of the disclosed subject matter.

Implementations of the presently disclosed subject matter may be implemented in and used with a variety of component and network architectures. FIG. 4 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 5.

Many other devices or components (not shown) may be connected in a similar manner (e.g., document scanners, digital cameras and so on). Conversely, all of the components shown in FIG. 4 need not be present to practice the present disclosure. The components can be interconnected in different ways from that shown. The operation of a computer such as that shown in FIG. 4 is readily known in the art and is not discussed in detail in this application. Code to implement the present disclosure can be stored in computer-readable storage media such as one or more of the memory 27, fixed storage 23, removable media 25, or on a remote storage location.

Figure 5:
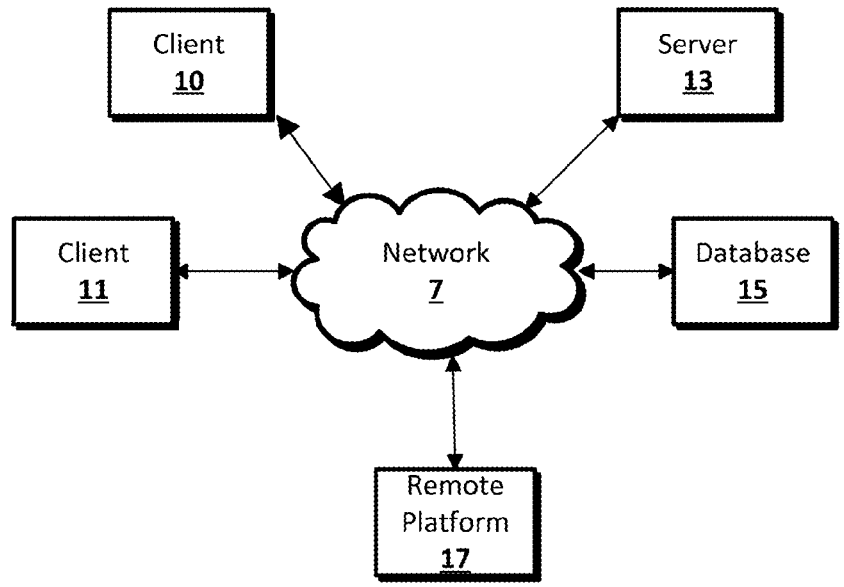
FIG. 5 shows a network configuration according to an implementation of the disclosed subject matter.

FIG. 5 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

In situations in which the implementations of the disclosed subject matter collect personal information about users, or may make use of personal information, the users may be provided with an opportunity to control whether programs or features collect user information (e.g., a user's provided input, a user's geographic location, and any other similar data associated with a user), or to control whether and/or how to receive data from a provider that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by systems disclosed herein.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A computer-implemented method, comprising:
receiving at an intermediary device a cable connection from a vehicle infotainment system;
sending by the intermediary device at least one first instruction to the vehicle infotainment system that changes a configuration of the vehicle infotainment system from a host mode to an accessory mode;
receiving at the intermediary device a connection from a remote device separate from the vehicle infotainment system;
detecting by the intermediary device a plurality of packets based on communications between the vehicle infotainment system and the remote device;
storing by the intermediary device a record based on the plurality of packets;
receiving at the intermediary device a second instruction from the remote device for execution on the infotainment system;
preventing by the intermediary device delivery of the second instruction to the infotainment system; and
providing by the intermediary device to the remote device, a confirmation of execution of the second instruction on the infotainment system.

2. The method of claim 1, further comprising determining a status of at least one of the vehicle infotainment system and the remote device, wherein the status indicates if the vehicle infotainment system or the remote device is in a host mode.

3. The method of claim 1, further comprising:
emulating, by the intermediary device, a third instruction of at least one of the vehicle infotainment system and the remote device; and
sending the third instruction according to a rule defined as:
if the third instruction being emulated is that of the remote device, the third instruction is sent to the vehicle infotainment system; and
if the third instruction being emulated is that of the vehicle infotainment system, the third instruction is sent to the remote device.

4. The method of claim 1, further comprising emulating, by the intermediary device, at least one of the vehicle infotainment system and the remote device.

5. The method of claim 4, further comprising:
generating a disconnect signal that emulates the remote device being disconnected from the vehicle infotainment system; and
sending the disconnect signal to the vehicle infotainment system.

6. The method of claim 1, further comprising forming a bridge during operation of the vehicle, wherein the bridge comprises both the infotainment system and the remote device in accessory mode and connected to the intermediary device.

7. The method of claim 1, wherein the vehicle infotainment system is configured to operate in a projected architecture with the remote device, wherein the projected architecture utilizes a processing capability of the remote device to output content on a display of the vehicle infotainment system.

8. The method of claim 1, further comprising decoding the plurality of packets.

9. A device, comprising:
a connection port configured to receive a cable connection from a vehicle infotainment system and a remote device; and
a processor configured to:
send at least one first instruction to the vehicle infotainment system that changes a configuration of the vehicle infotainment system from a host mode to an accessory mode;
detect a plurality of packets based on communications between the vehicle infotainment system and the remote device;
store a record based on the plurality of packets;
receive a second instruction from the remote device for execution on the infotainment system;
prevent delivery of the second instruction to the infotainment system; and
provide to the remote device, a confirmation of execution of the second instruction on the infotainment system.

10. The device of claim 9, the processor further configured to determine a status of at least one of the vehicle infotainment system and the remote device, wherein the status indicates if the vehicle infotainment system or the remote device is in a host mode.

11. The device of claim 9, the processor further configured to:
emulate a third instruction of at least one of the vehicle infotainment system and the remote device; and
send the third instruction according to a rule defined as:
if the third instruction being emulated is that of the remote device, the third instruction is sent to the vehicle infotainment system; and
if the third instruction being emulated is that of the vehicle infotainment system, the third instruction is sent to the remote device.

12. The device of claim 9, the processor further configured to emulate at least one of the vehicle infotainment system and the remote device.

13. The device of claim 12, the processor further configured to:

generate a disconnect signal that mimics the remote device being disconnected from the vehicle infotainment system; and send the disconnect signal to the vehicle infotainment system.

14. The device of claim 9, the processor further configured to form a bridge during operation of the vehicle, wherein the bridge comprises both the vehicle infotainment system and the remote device in accessory mode and both being connected to the device.

15. The device of claim 9, wherein the vehicle infotainment system is configured to operate in a projected architecture with the remote device, wherein the projected architecture utilizes a processing capability of the remote device to output content on a display of the vehicle infotainment system.

16. The device of claim 9, the processor further configured to decode the plurality of packets.

\* \* \* \* \*